United States Patent [19]

Kerr

[11] Patent Number: 4,533,037

[45] Date of Patent: Aug. 6, 1985

[54] TELESCOPING CONVEYOR BELT CLEANER

[75] Inventor: James F. Kerr, Croswell, Mich.

[73] Assignee: Material Control, Inc., Croswell, Mich.

[21] Appl. No.: 659,911

[22] Filed: Oct. 11, 1984

Related U.S. Application Data

[63] Continuation of Ser. No. 473,474, Mar. 9, 1983, abandoned.

[51] Int. Cl.³ .............................................. B65G 45/00
[52] U.S. Cl. ...................................... 198/499; 15/256.5
[58] Field of Search ...................... 198/497, 498, 499; 15/256.5

[56] References Cited

U.S. PATENT DOCUMENTS

| | | | |
|---|---|---|---|
| 1,543,411 | 6/1925 | Wittig | 198/495 |
| 1,719,094 | 7/1929 | Vickery | 15/256.51 |
| 1,792,501 | 2/1931 | Maniere | 198/499 |
| 1,880,002 | 9/1932 | White | 198/624 |
| 1,975,591 | 10/1934 | Sinden | 198/499 |
| 2,168,622 | 8/1939 | Levin | 198/842 |
| 2,255,314 | 9/1941 | Graham | 384/546 |
| 2,551,123 | 5/1951 | Heller | 198/230 |
| 2,724,999 | 11/1955 | Scott | 92/74 |
| 2,794,540 | 6/1957 | Sinden | 198/230 |
| 2,850,146 | 9/1958 | Madeira | 198/109 |
| 3,088,156 | 5/1963 | Ljungquist et al. | 15/256.53 |
| 3,315,794 | 4/1967 | Ellington | 198/230 |
| 3,342,312 | 9/1967 | Reiter | 198/230 |
| 3,504,786 | 1/1968 | Matson | 198/230 |
| 3,598,231 | 8/1971 | Matson | 198/230 |
| 3,631,968 | 1/1972 | Ward | 198/230 |
| 3,656,610 | 4/1972 | McWilliams | 198/230 |
| 3,674,131 | 7/1972 | Matson | 198/499 |
| 3,688,336 | 9/1972 | Costello, Jr. et al. | 15/256.51 |
| 3,722,667 | 3/1973 | Olson | 198/230 |
| 3,740,789 | 6/1973 | Ticknor | 15/256.53 |
| 3,750,228 | 8/1973 | Wake | 15/256.53 |
| 3,986,227 | 10/1976 | Fathergill et al. | 15/256.53 |
| 3,994,384 | 11/1976 | Reiter | 198/497 |
| 3,994,388 | 11/1976 | Reiter | 198/499 |
| 4,019,217 | 7/1977 | Schinke | 15/256.53 |
| 4,036,351 | 7/1977 | Reiter | 198/499 |
| 4,036,354 | 7/1977 | Reiter | 198/499 |
| 4,042,364 | 8/1977 | King et al. | 65/168 |
| 4,098,394 | 7/1978 | Stahura | 198/499 |
| 4,249,650 | 2/1981 | Stahura | 198/499 |
| 4,344,525 | 8/1982 | Bancroft | 198/499 |

FOREIGN PATENT DOCUMENTS

| | | |
|---|---|---|
| 910834 | 9/1972 | Canada . |
| 960990 | 1/1975 | Canada . |
| 862003 | 2/1941 | France . |
| 572062 | 9/1945 | United Kingdom . |

OTHER PUBLICATIONS

Martin Engineering Company Brochure, Form No. 2005, Entitled "Vibratory Torsion Arm Belt Cleaner", 4 pages, (Copyright 1967).

Stephens-Adamson Mfg. Co., Bulletin No. 1854, (3M-S-6-60), Entitled "S-A Spring Type Conveyor Belt".

Martin Conveyor Products, Installation and Service Manual, Form No. 2894-1/80, Entitled "Martin Trac--Mount Belt Cleaner", 74 pages.

Martin Conveyor Products Brochure, Entitled "Martin Trac-Mount Systems", 8 pages, (Copyright 1979).

Vibrolator Mfg. Co. Blueprint, Entitled "Belt Cleaner Spring Arm", Drawing No. A-15189, Dec. 6, 1967.

Martin Engineering Co. Brochure, Entitled "Vibratory Torsion Arm Belt Cleaner", Form No. 1289-1068, 2 pages.

Stephens-Adamson Mfg. Co. Catalog, Entitled "Stephens-Adamson Catalog 6.6", Cover Page and pp. 65-66, Copyright 1954.

Martin Engineering Co. Brochure, Entitled "Mounting Instructions Heavy Duty PM Model Belt Cleaners", Form No. 2620-1173, 1 page.

Conveyor Components Co. Catalog, Entitled "Conveyor Components", Catalog No. C-216, 32 Pages (Copyright 1970, 1975, 1977).

Conveyor Components Co. Catalog, Entitled "Conveyor Components", Catalog No. C-218, 32 Pages (Copyright 1970, 1975, 1977, 1980, 1981).

Conveyor Components Co. Brochure, Entitled "Model FA", pp. 6 and 7.

*Primary Examiner*—Joseph E. Valenza
*Assistant Examiner*—Michael Stone

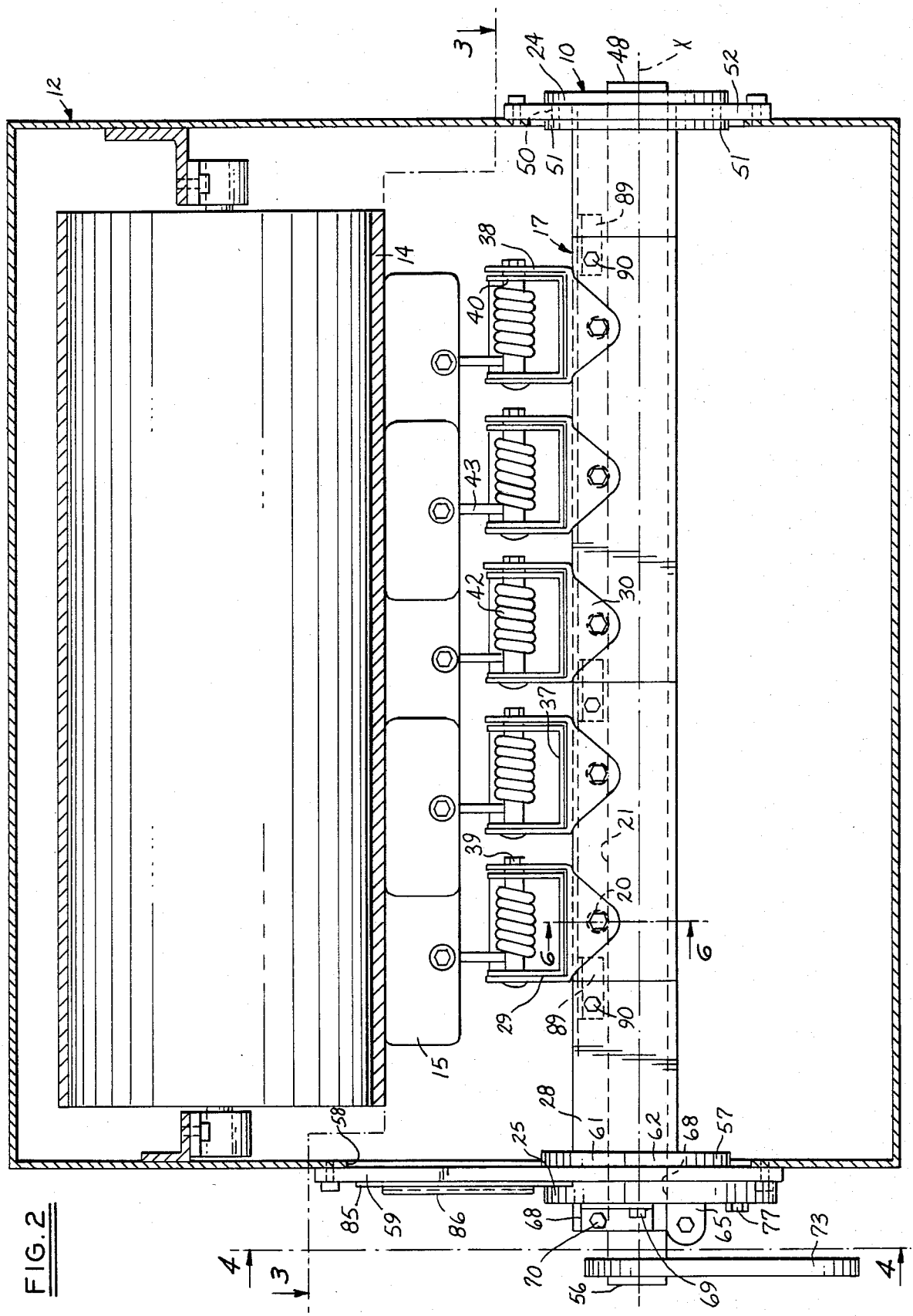

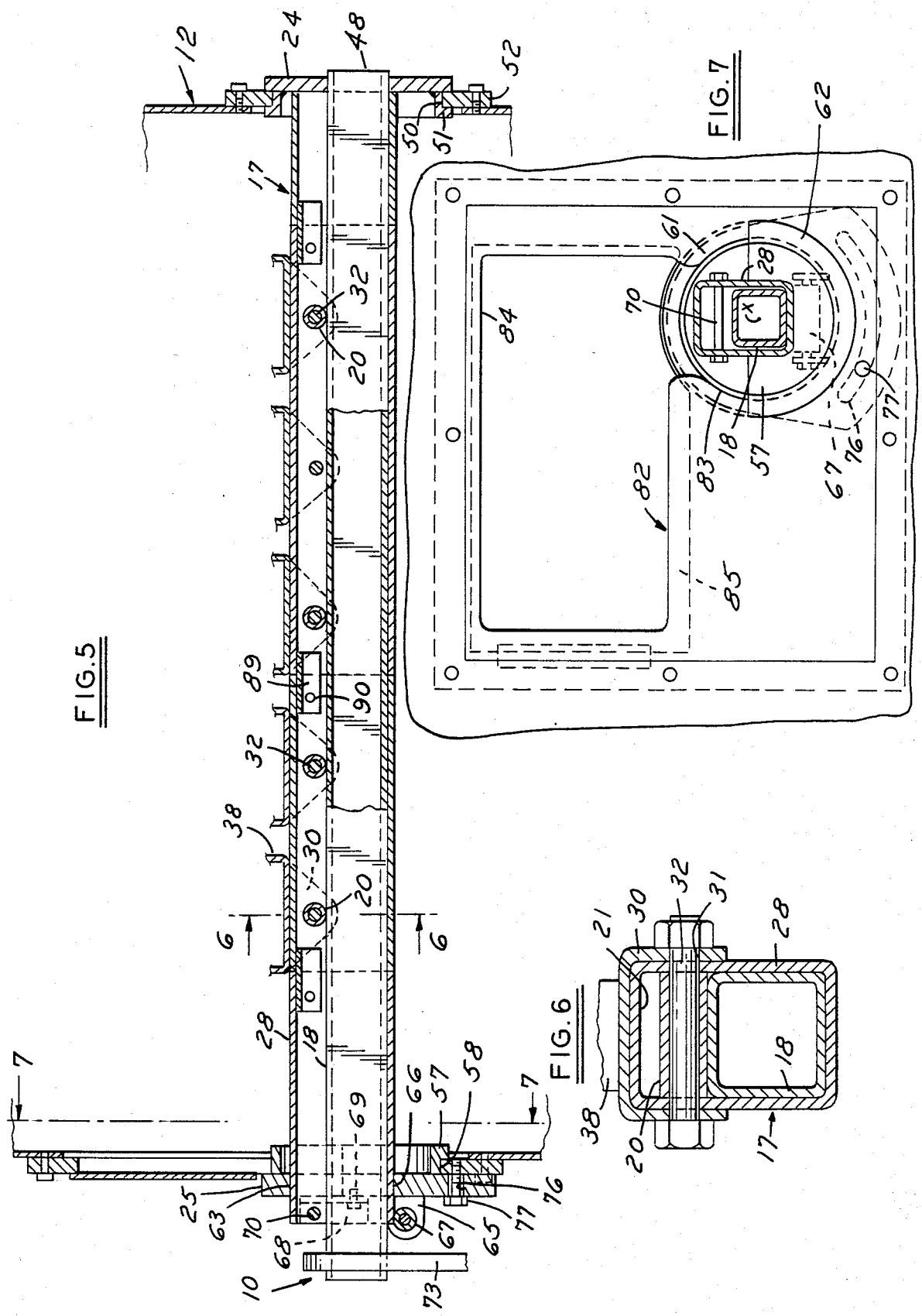

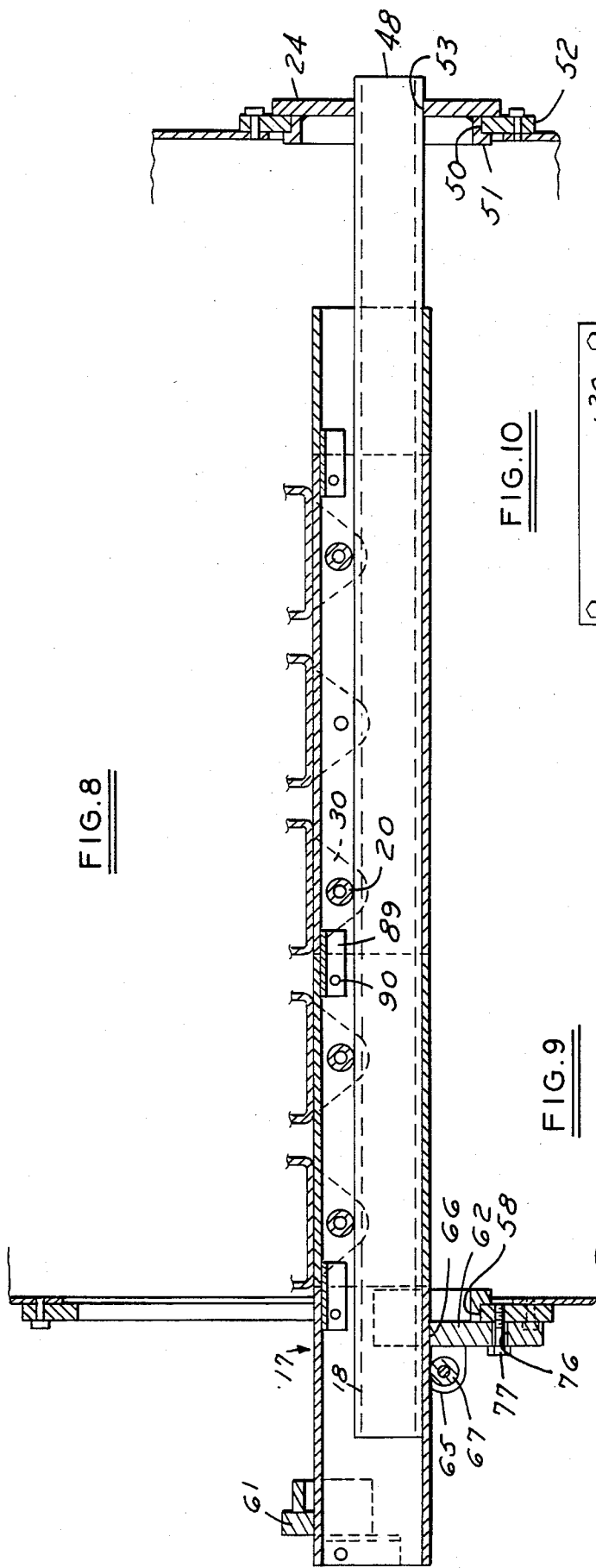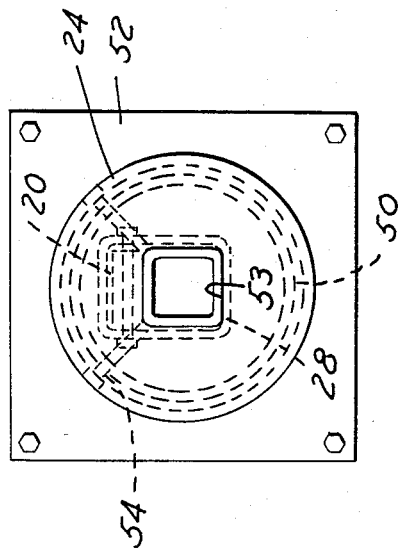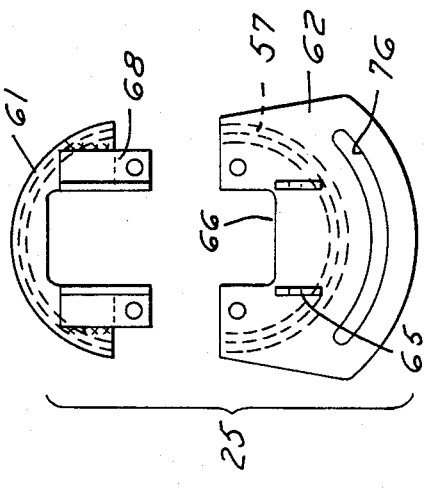

TELESCOPING CONVEYOR BELT CLEANER

This application is a continuation of my U.S. patent application, Ser. No. 473,474, filed Mar. 9, 1983, now abandoned.

TECHNICAL FIELD

The present invention relates to conveyor belt cleaners and more specifically to conveyor belt cleaners having blades for removing debris from the surface of a conveyor belt.

BACKGROUND OF THE INVENTION

Conveyor belt cleaners are used on conveyors for continuously cleaning the surface of a moving conveyor belt by scraping debris from the lower run of the conveyor belt.

Conveyor belt cleaners should be rugged in construction and unaffected by debris falling from the surface of the conveyor belt. Conveyor belt cleaners are typically mounted beneath the lower run of the conveyor belt where debris removed from the surface of the belt may be deposited thereon. Accumulations of debris on moveable parts and surfaces over which parts move may inhibit movement and cause accelerated wear of the surfaces and parts.

Conveyors used to haul coal in mines and in electrical power plants frequently include a water spray to minimize coal dust in the air around the conveyor. The water and coal dust combine to form troublesome sludge deposits on the conveyor belt which are difficult to remove. As a result, heavy duty conveyor belt cleaners are used to remove the sludge deposits from the surface of the conveyor belt. The abrasive nature of the sludge deposits cause rapid abrasion of the blades, and any moving parts of the cleaner upon which they accumulate. In addition, the accumulation of sludge deposits on surfaces over which parts move can cause parts to become jammed.

Service is periodically required on the blades and blade support apparatus of conveyor belt cleaners. The blades are subject to wear over time and require adjustment to compensate for the wear. Eventually the blades and blade support apparatus must be replaced. In some applications, service is required on a daily basis to keep the conveyor belt cleaner functioning properly. As the frequency of service increases, the ease of servicing the cleaner becomes more important.

The conveyor belt cleaner may be safely serviced by either stopping the conveyor belt to work on the scraper blades and support structure while underneath the conveyor, or by moving the scraper blades and their support members from under the conveyor. If the conveyor belt cleaner is serviced in its operative position, under the conveyor, the conveyor belt should be stopped prior to servicing. However, if the scraper blades and support structure are removed from the conveyor, the servicing operations may be performed while the conveyor continues to operate.

One way of making a conveyor belt cleaner that is serviceable while the conveyor belt is operating is disclosed in U.S. Pat. No. 4,249,650 to Stahura. In the Stahura patent individual belt scraper blades are affixed to concentric sleeve members which slide linearly upon a support member arranged transverse to the direction of conveyor belt travel. The individual belt scraper blades are interconnected by links and all of the blades are moved along the support member by means of a cable. While the scraper blades of this apparatus may be serviced beside the conveyor belt, dirt and debris may accumulate on the support member between the sleeve members, making it difficult to move the sleeve members along the support member. This is particularly true when many sleeve members are linked together to provide a long scaper blade because the sliding friction between the respective members increases with length.

If the Stahura device is used, dirt deposits between the sleeve and support member may abrade the surface of the support member or sleeve. Such abrasion causes accelerated wear on the members which loosens the fit of the sleeve on the support member. These problems are particularly apparent when the cleaner is used to remove abrasive substances from the surface of the conveyor belt such as coal dust or sludge.

Another disadvantage of such a device is that the cord used to move the sleeve members and blades along the support member can become entangled in trailers, or torn portions of the belt, resulting in damage to the belt or belt cleaner.

These and other problems encountered by prior art conveyor belt cleaners are overcome by the present invention.

SUMMARY OF THE INVENTION

The present invention relates to a conveyor belt cleaner having scraper blades that are mounted on a blade crrying member to be rolled onto and off of a support member. The versatile blade carrying member of the present invention is adapted for use with doctor blade conveyor belt scrapers, spring arm mounted conveyor belt scrapers, or other types of belt cleaning devices.

According to the present invention, a conveyor belt cleaner for an endless belt conveyor is provided in which the blade carrying member and support member have rotatable means interposed therebetween to permit the blade carrying member to be rolled along the support member.

The blade carrying member is uniquely constructed to shield the rollers and rolling surface from the deposit of dirt and debris to prolong the life of the conveyor belt cleaner. The conveyor belt cleaner is rugged in construction, long wearing and resists jamming.

According to another feature of the present invention, the rotatable means comprise cylindrically shaped rollers rotatably journalled on the blade carrying member.

According to another feature of the present invention, the blade carrying member substantially encloses the support member to prevent the deposit of dirt on the support member while the blade carrying member is in its operative position.

Other features and advantages of the invention will become apparent upon reading the following detailed description with reference to the drawings.

BRIEF DESCRIPTION OF THE DRAWINGS

FIG. 2 is an end view of the conveyor belt cleaner of the present invention taken along the line 2—2 of FIG. 1.

FIG. 5 is a fragmentary cross-sectional view of the present invention.

FIG. 6 is a fragmentary cross-sectional view taken along the line 6—6 in FIG. 2.

FIG. 7 is a fragmentary cross-sectional view taken along the line 7—7 in FIG. 5.

FIG. 8 is a fragmentary cross-sectional view as shown in FIG. 5 with the blade carrying member partially removed from the support member.

FIG. 9 is an end view of the split collar which supports one end of the blade carrying member.

FIG. 10 is an end view of the collar which engages one end of the support member.

DETAILED DESCRIPTION

Figure 1:
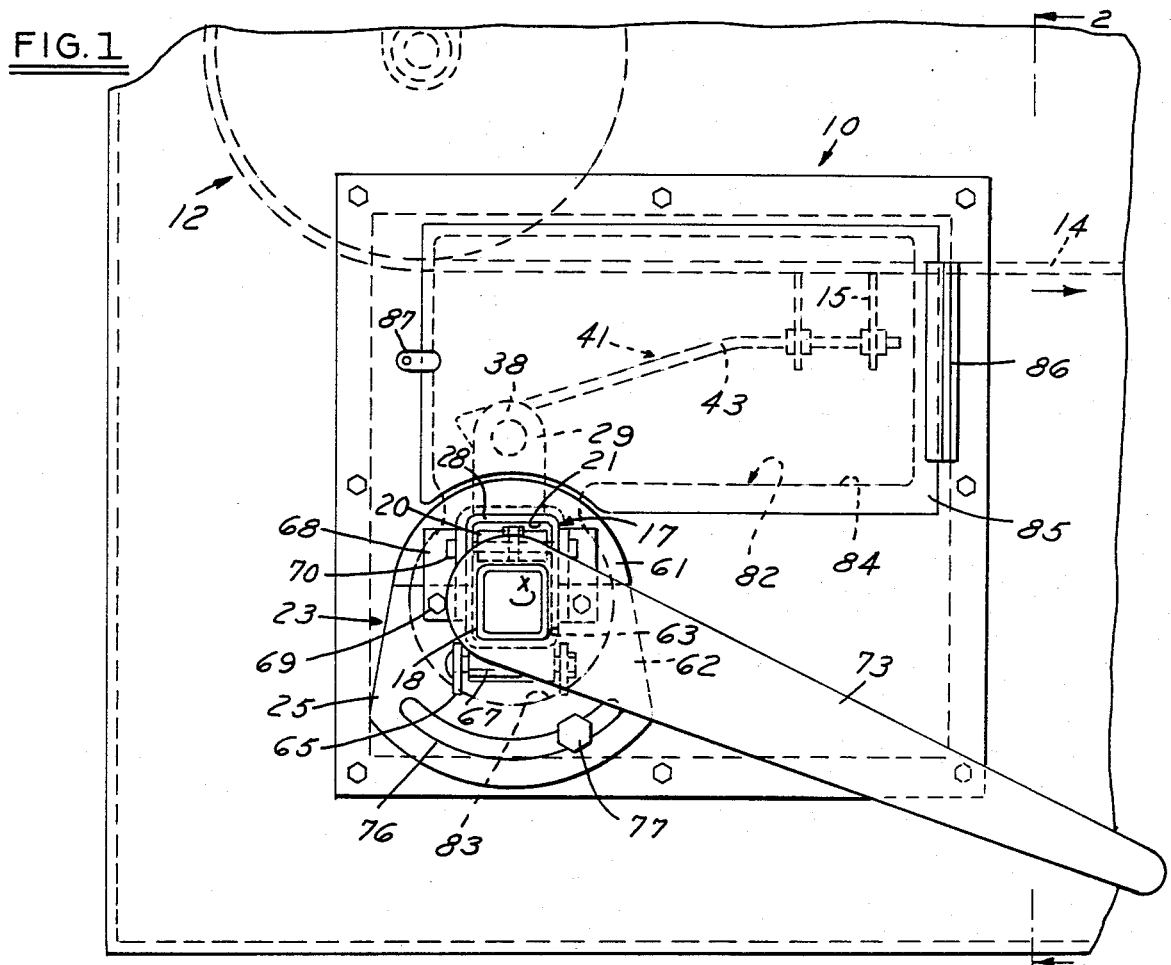
FIG. 1 is a side view of the conveyor belt cleaner of the present invention shown assembled to the conveyor belt in its operative position.
Figure 4:
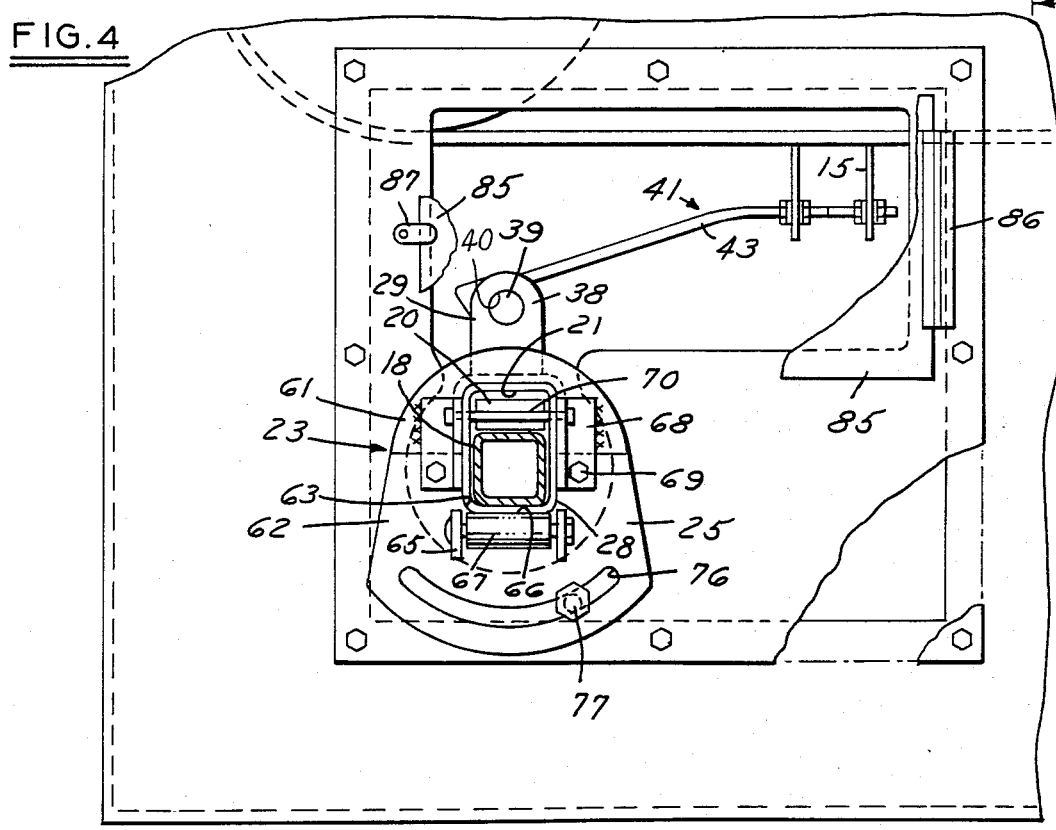
FIG. 4 is a fragmentary cross-section side view of the conveyor belt cleaner with the access doors partially cut-away and is taken along the line 4—4 in FIG. 2.
Figure 3:
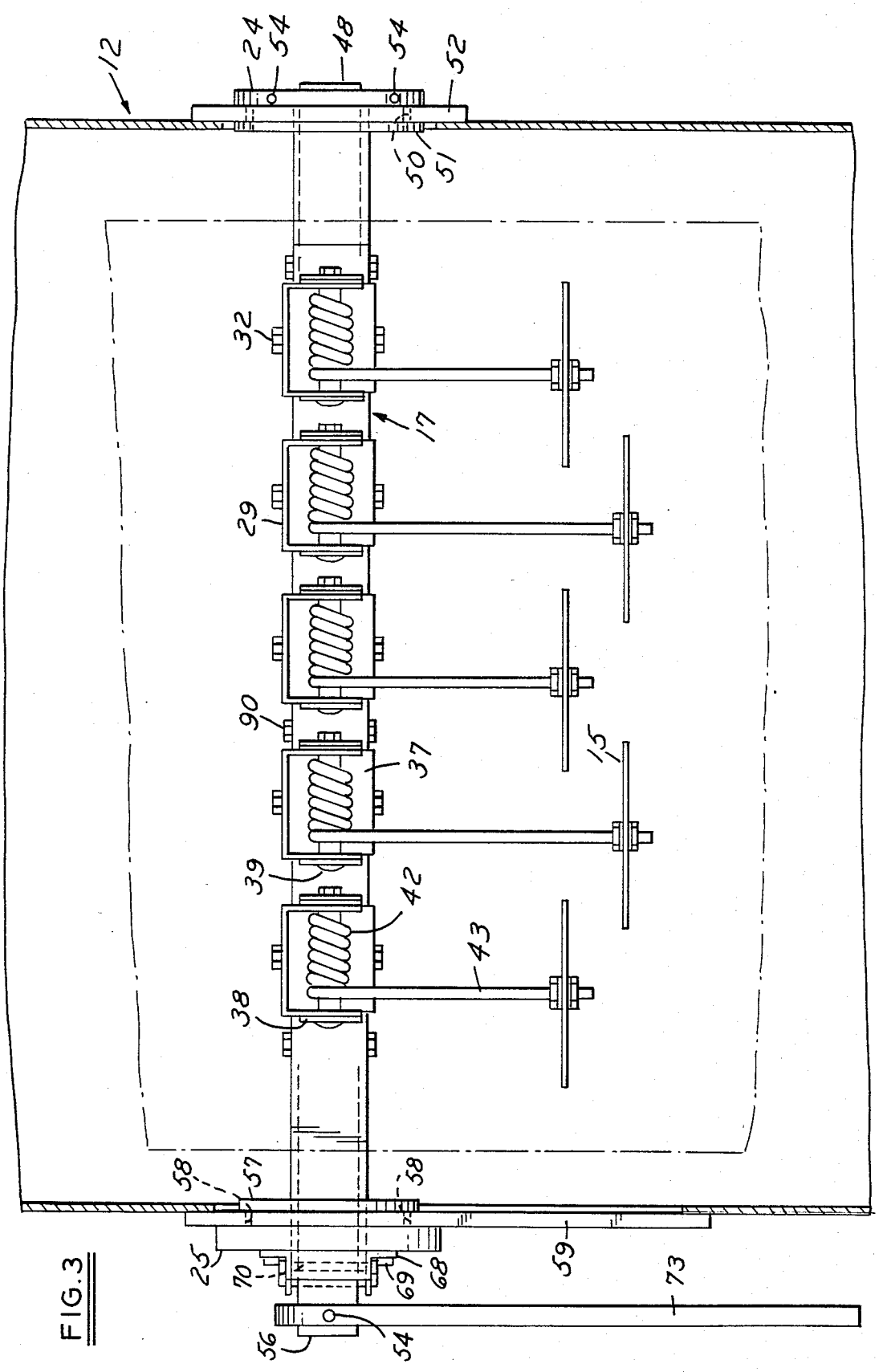
FIG. 3 is a plan view of the conveyor belt cleaner taken along the line 3—3 in FIG. 2.

Referring now to the drawings, a conveyor belt cleaner, generally designated by the numeral 10, is attached to a conveyor 12 to clean the surface of an endless belt 14. A blade 15, or blades, is provided on the cleaner 10 to scrape the surface of the endless belt 14 as it moves past the cleaner 10. The blade 15 is retained by a blade carrying member, generally indicated by the numeral 17, which is in turn retained on a support member 18 when in its operative position on the conveyor 12. The support member 18 extends transverse to the direction of travel of the endless belt 14. A plurality of rollers 20 are provided between the blade carrying member 17 and the support member 18 within a clearance space 21 bounded by opposing surfaces of the blade carrying member 17 and support member 18. The conveyor belt cleaner 10 of the present invention can be easily serviced by rolling the blade carrying member 17 along the support member 18 to a position wherein the blade 15 is disengaged from the endless belt 14.

An adjustable mounting means, generally indicated by the reference numeral 23 is provided for holding opposite ends of the support member 18 on opposite sides of the conveyor 12. The adjustable mounting means includes a pivotable collar 24 on one end of the support member and a locking collar 25 on the opposite end for selectively pivoting the support member 18 about its longitudinal axis "X". The adjustable mounting means 23 permits the support member 18 to be rotated which in turn causes the blade carrying member 17 to be rotated to force the blade 15 to be moved toward or away from the endless belt 14 as required to facilitate servicing the belt.

The blade carrying member 17 comprises a rectangular tubular member 28 substantially enclosing and extending across the length of the support member 18. The rectangular tube 28 may be segmented, if desired, to permit removal of the blade carrying member 17 in confined areas. Frequently there is insufficient space beside a conveyor 12 to permit the entire blade carrying member 17 to be rolled off in one piece. In such situations, the blade carrying member 17 may be split into two or more segments.

The blade carrying member shown in FIGS. 1 through 10 discloses the use of a spring arm support 29.

The spring arm support 29 includes ears 30 on opposite sides of the rectangular tube 28. A hole 31 is formed through the ears 30 and rectangular tube 28 through which a shaft 32 extends. On opposite ends of the rectangular tube 28, or segments of the rectangular tube 28, rollers 20 are disposed on two of the shafts 32. Each shaft 32 is attached to the rectangular tube 28 with their axis of rotation transverse to the axis "X" of the support member 18. The rollers 20 are thereby adapted to roll along the top surface of the support member 18 in a direction parallel to the axis "X". Each spring arm support 29 also includes a base portion 37 secured to the top of the rectangular tube 28 with perpendicular tab portions 38 extending from opposite sides of the base portion 37. The tab portions 38 each include a hole 40 for receiving a machine screw and nut assembly 39 which is used to retain the spring arm assembly 41 on the spring arm support 29.

The spring arm assembly 41 includes a helical spring portion 42 through which the machine screw and nut assembly 39 extends and a rod portion 43 extending from the helical spring portion 42 to which the blade 15 is secured by suitable fasteners.

The pivotable collar 24 retains a first end 48 of the support member and includes a rim 51 extending through a circular opening 50 formed in a reinforcement plate 52. The reinforcement plate 52 is a rigid member fastened to the side of the conveyor which is capable of withstanding the stresses applied to the cleaner 10 during operation and adjustment of the same. In the disclosed embodiment the pivotable collar 24 includes a square opening 53 for receiving the first end 48 of the support member 18. The support member 18 is secured within the square opening 53 by means of set screws 54 in the disclosed embodiment, but may be otherwise anchored to the pivotable collar 24.

The locking collar 25 retains the support member 18 near the second end 56 of the support member. The locking collar 25 has an annular rim 57, generally L-shaped in cross-section, which extends through an opening 58 in the cover plate 59. The cover plate 59 is provided to secure the cleaner 10 to the conveyor 12 on the opposite side of the conveyor from the pivotable collar 24. The cover plate 59 reinforces the conveyor 12 where the cleaner 10 is attached. The locking collar 25 is split into an upper portion 61 and a lower portion 62 to permit removal of the blade carrying member 17 from the support member 18. The upper portion 61 is secured to and moves with the rectangular tube 28 of the blade carrying member 17. The lower portion is attached to the cover plate 59 by means of the rim 57 and is retained thereby when the blade carrying member 17 is removed. The upper and lower portions 61 and 62 define a rectangular opening when the blade carrying member 17 is in its operative position on the support member 18. A roller bracket 65 is provided at the lower edge 66 of the rectangular opening 63 for journalling the end roller 67. The end roller 67 is adapted to engage the lower surface of the blade carrying member 17 as it is pulled through the locking collar 25 to permit the blade carrying member to be moved through the rectangular opening 63 easily.

A pair of L-shaped extensions 68 are provided on opposite sides of the rectangular opening 63. The extensions 68 are detachably attached to the lower portion 62 by means of machine screws 69 and are attached to the upper portion 61 by means of a fastener 70 interconnecting the extension 68 with the rectangular tube 28 of the blade carrying member 17. The extensions 68 tie the upper and lower portions 61 and 62 of the collar together when the blade carrying member 17 is in its operative position. However, when it is desireable to remove the blade carrying member 17 from the support member 18, the machine screws 69 may be removed to permit the blade carrying member 17 to be rolled off the support member 18 with the upper portion 61 of the locking collar 25 attached.

A detachable handle 73 is secured to the second end 56 of the support member 18, preferably by means of a set screw 74. The handle 73 must be removable so that the rectangular tube 28 of the blade carrying member 17 may be rolled off the second end of the support member 18. The handle 73 is used to apply pressure to arcuately move the support member 18 which in turn causes the blade 15 to move either into or out of engagement with the endless belt 14. When it is desireable to remove the blade carrying member from the support member the support member is rotated to move the blades 15 out of engagement with the endless belt 14 to reduce the force required to remove the blade carrying member. When the cleaner 10 is in its operative position, the blades are urged into contact with the belt by the handle 73. An arcuate slot 76 is provided on the locking collar 25, preferably in the lower portion 62, through which a machine screw 77 may be secured to the cover plate 59 to hold the locking collar 25 in a fixed position.

As an alternative, the conveyor belt cleaner of the present invention may include a handle 73 on both sides to permit pressure to be applied to the support member 18 evenly on opposite sides. This alternative embodiment may be desireable for wide conveyor belts where twisting of the support member may be encountered. Also, the two handled embodiment allows additional pressure to be applied to urge the blade 15 toward the belt 14. A second locking collar 25 having an arcuate slot 76 and machine screw 77 may be provided to hold both ends of the support member 18 in a fixed position.

An access opening 82 is formed in the side of the conveyor 12 to permit the blade carrying member with the spring arm assembly 41 and blade 15 to be moved through the side of the conveyor 12. The access opening includes a circular portion 83 for rotatably receiving the locking collar 25. A rectangular portion 84 of the access opening 82 provides clearance for the spring arm assembly 41 and blades to be moved through the side of the conveyor 12. The rectangular portion 84 is closed during operation of the cleaner by means of an access door 85 which is connected to the conveyor by means of a hinge 86 and latch 87.

As previously discussed the blade carrying member 17 may be formed in a plurality of segments if insufficient space is available to permit the blade carrying member to be removed in one piece from the conveyor 12. Although it is preferred to use a single piece blade carrying member, if the blade carrying member must be broken into segments the shielding function of the blade carrying member may be accomplished by the use of channel shaped linking members 89. The linking members 89 are welded to one segment and connected by fasteners 90 to an abutting segment. The fasteners 90 may then be removed as each segment is pulled off the support member 18. One advantage of the segmented arrangement is a segment of the blade carrying member may be replaced as a unit if it becomes damaged. It is important that the linking members 89 substantially cover the space between abutting segments so that dirt and debris are not permitted to fall from the conveyor belt 14 to the support member 18.

Rubber sealing rings may also be used according to the present invention to provide an additional shield between adjacent segments. The rubber sealing rings may include means on opposite sides for gripping the edges of adjacent segments.

Figure 12:
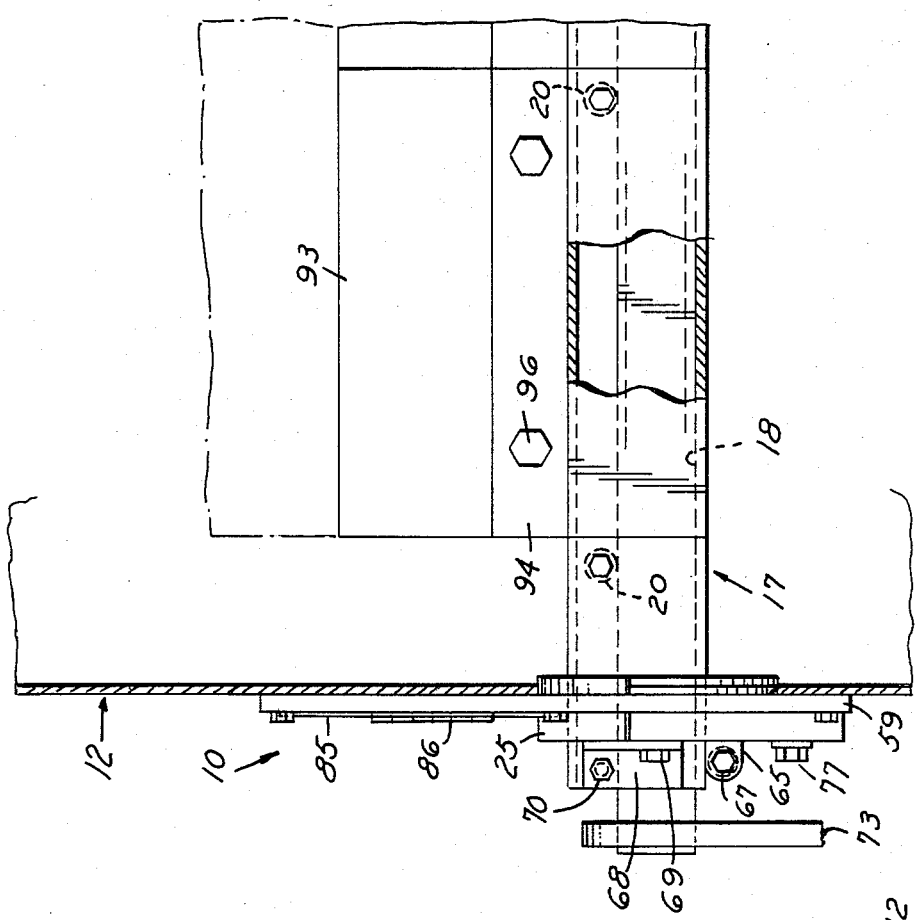
FIG. 12 is a fragmentary cross-sectional view of the embodiment of the present invention shown in FIG. 11 taken along the line 12—12.
Figure 11:
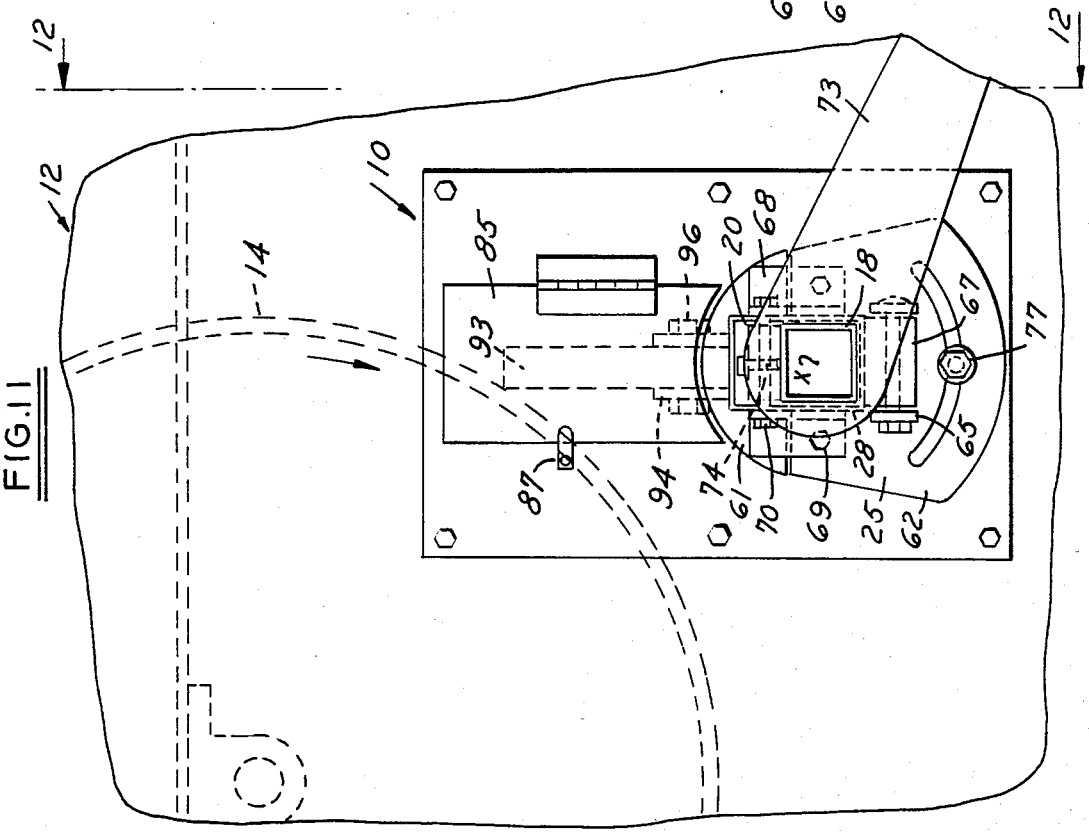
FIG. 11 is a side view of another embodiment of the present invention wherein a doctor blade is mounted on the blade carrying member.

In another embodiment of the present invention, shown in FIGS. 11 and 12, a unitary or sectional scraper, or doctor blade 93, made from urethane or other suitable material, may be attached to the blade carrying member 17 to scrape the conveyor belt 14 instead of the spring arm assembly 41 and spring arm support 29. In this embodiment the doctor blade 93 is secured to the blade support member 17 by means of a blade clamp 94 which includes a plurality of fasteners 96 extending therethrough which lock the blade 93 in place. The other parts of the conveyor belt cleaner are substantially similar in configuration and their description will not be repeated.

OPERATION

Operation of the present invention will be described with reference to the spring arm mounted blade embodiment, but it is understood that the embodiment having the doctor blade 93 operates in substantially the same manner as the embodiment having spring arm 41 mounted blade 15.

In operation, the blade 15 is retained by the blade carrying member 17 in pressure engagement with the endless belt 14. Pressure is applied by positioning the support member 18 so that the blades are held in tension against the endless belt 14.

In the normal course of usage, the blades 15 will wear as a result of the belt 14 abrading the edge of the blade 15 in contact with the belt 14. To periodically compensate for blade wear, the adjustable mounting means 23 may be used to increase the pressure applied by the blade 15 on the belt 14. The adjustable mounting means 23 is adjusted by loosening the machine screws 77 and turning the handle 73 to rotate the blade 15 about the axis "X" toward the belt 14. The machine screw 77 in the arcuate slot 76 is then tightened to hold the mounting means 23 in place.

The conveyor belt cleaner 10 must be inspected periodically to determine if there are any broken blade carrying members or blades. If so, the conveyor belt cleaner 10 may be serviced by simply loosening the screw 77 to permit the locking collar 25 to rotate about the axis "X" until the blade 15 disengages the belt 14. The handle 73 is then removed from the second end 56 of the support member 18 by loosening the set screw 74. The screws 69 securing the extensions 68 to the lower portion 62 of the locking collar 25 are loosened to permit the upper portion 61 and blade carrying member 17 to be removed from the conveyor 12. Access door 85 is opened to permit the blade carrying member to be withdrawn through the access opening 82.

It will be readily appreciated that the entire procedure can be safely performed without stopping the conveyor. After removal, the blade carrying member may be serviced or replaced with an equivalent blade carrying member 17. To reinstall the blade carrying member the above steps are reversed and the blade is tightened against the belt 14.

If a segmented blade carrying member is used to permit removal in confined areas, the same procedure is followed except that as each section is withdrawn the fastener 90 is removed and the section is lifted off the channel 89.

It should be readily appreciated that the blade carrying member is easy to remove from the support member 18 since the movement is aided by the rollers 20 located in the clearance space 21 formed between adjacent surfaces of the blade carrying member 17 and the support member 18. The blade carrying member 17 is supported on its lower surface at the second end of the support member 18 on the end roller 67. Free movement of the rollers 20 along the support member 18 is assured because the rectangular tube 28 shields the support member 18 from the deposit of dirt and debris.

The above description is submitted as an example of the invention and should not be construed by way of limitation. The present invention should be construed in accordance with the following claims.

I claim:

1. A conveyor belt cleaner for use on a conveyor having an endless belt comprising:
   an elongate support member having a first longitudinal axis adapted to extend transversely of the endless belt;
   a blade carrying member carried by said support member and having a second longitudinal axis spaced from and parallel to said first longitudinal axis, said blade carrying member including one or more blades adapted to scrape the endless conveyor belt; and
   rotatable means interposed between said support member and said blade carrying member for rolling the blade carrying member along the support member, said rotatable means being mounted for rotation on one of said members and in rolling contact with the other of said members.

2. The conveyor belt cleaner of claim 1 wherein said rotatable means comprises a plurality of cylindrically shaped rollers having a cylindrical axis perpendicular to said first and second longitudinal axes.

3. The conveyor belt cleaner of claim 2 wherein said rollers are rotatably supported on said blade carrying member.

4. The conveyor belt cleaner of claim 2 wherein each of said rollers has a central opening formed therethrough in alignment with the cylindrical axis of the rollers, and a shaft extending through the central opening of the corresponding roller.

5. The conveyor belt cleaner of claim 4 wherein said support member comprises a first tubular member having an upper surface, said support member at one end being adapted to be secured to a support;
   arm means attached to the blade carrying member for securing each of said blades to said blade carrying member, a second tubular member telescopically received on said first tubular member and together defining a clearance space therebetween said rollers being disposed in the clearance space to permit the blade carrying member to be rolled onto and off of the support member for servicing the conveyor belt cleaner.

6. The conveyor belt cleaner of claim 5 wherein a plurality of said blade carrying members are assembled onto the support member in end to end abutting relationship, said blade carrying members each having a plurality of rollers with each roller being journalled on a shaft and disposed within the clearance space, said shafts being aligned parallel to one another to permit the rollers to facilitate rolling of the blade carrying member along the support member.

7. The conveyor belt cleaner of claim 6 wherein said blades are secured to a spring arm attached to each of the blade carrying members.

8. The conveyor belt cleaner of claim 6 wherein said blade is an elongate unitary and substantially rigid elastomeric member.

9. The conveyor belt cleaner of claim 6 wherein said blade carrying members are detachably secured together at each abutting end by a linking member.

10. In the conveyor belt cleaner of claim 9 wherein said linking members extend between said blade carrying members and cooperate with the blade carrying members at the abutting ends to shield the upper surface of the support member from debris falling from the endless belt.

11. A conveyor belt cleaner having a blade for scraping the surface of an endless belt of a conveyor, a blade carrying member for retaining said blade and holding the blade in engagement with the endless belt, an elongate support member having a central axis extending transversely relative to the direction of movement of the endless conveyor belt and being supported on opposite ends by first and second vertically extending members wherein the improvement comprises:
   rotatable means for permitting the blade carrying member to be rolled on and off the elongate support member.

12. The conveyor belt cleaner of claim 11 wherein said first vertically extending member has an opening formed therein for moving the blade carrying members and blade from one side to the other side of the first vertically extending member to permit removal and replacement of the blade carrying member and blade.

13. In the conveyor belt cleaner of claim 12, a guide roller rotatably secured to the first vertically extending member adjacent the opening for rolling engagement with a lower surface of the blade carrying member as it is moved through the opening.

14. In the conveyor belt cleaner of claim 12, adjustment means for changing the pressure said blade exerts upon said endless belt.

15. The conveyor belt cleaner of claim 14, wherein said adjustment means comprises:
   first and second arcuately shiftable collars adapted to be secured to said first and second vertically extending members;
   said first collar having a shaft for journalling a guide roller adjacent the opening in the first vertically extending member;
   said second collar being secured to the support member on a first end; and
   said guide roller of the first vertically extending member engaging the lower surface of the blade carrying member for supporting the blade carrying member and the second end of the support member.

16. A conveyor belt cleaner for a conveyor having an endless belt with upper and lower runs, having an elongate support member adapted to be secured near the lower run, and extending transversely across the lower run, first and second end supports interconnecting said support member to opposite sides of the conveyor, a blade carrying member moveably attached to the elongate support member and having means for attaching a blade thereto, said blade being a substantially rigid member adapted to engage the surface of the lower run of the endless belt to scrape debris therefrom in an operative position wherein the improvement comprises:

a plurality of rotatable members disposed between the elongate support member and said blade carrying member to facilitate moving said blade carrying member along the elongate support member, said blade carrying member substantially enclosing the rotatable members and the elongate support member when in its operative position to shield the same from debris falling downwardly from the lower run of the endless belt.

17. The conveyor belt cleaner of claim 16 wherein said blade carrying member has an open ended rectangular in cross-section tubular portion substantially enclosing the support member.

18. The conveyor belt cleaner of claim 17 wherein said support member telescopes inside said blade carrying member and defines a space between an upper surface of the elongate support member and an inner surface of the blade carrying member, said plurality of rotatable members being rotatably secured to said blade carrying member in the space.

19. The conveyor belt cleaner of claim 18 wherein a plurality of said blade carrying members are linked together by one or more linking members to be moved as a unit along the support member.

20. The conveyor belt cleaner of claim 19 wherein said linking members span the spaces between adjacent blade carrying members to prevent the deposit of debris upon said support member.

21. The conveyor belt cleaner of claim 17 further comprising means for rotating said support member about an axis extending transversely across the lower run of the endless belt said axis being parallel to the support member for adjusting the pressure exerted by the blades upon the endless belt.

* * * * *